(12) United States Patent
Onianwa et al.

(10) Patent No.: US 11,240,303 B2
(45) Date of Patent: Feb. 1, 2022

(54) PROCESSING AND ORDERING MESSAGES IN PARTITIONS

(71) Applicant: Microsoft Technology Licensing, LLC, Redmond, WA (US)

(72) Inventors: Chukwunwike I. J. Onianwa, Sammamish, WA (US); Krishna Kannan, Seattle, WA (US); Vignesh Somasundaram, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/780,575

(22) Filed: Feb. 3, 2020

(65) Prior Publication Data

US 2021/0168204 A1 Jun. 3, 2021

Related U.S. Application Data

(60) Provisional application No. 62/942,737, filed on Dec. 2, 2019.

(51) Int. Cl.
*H04L 29/08* (2006.01)
*G06N 20/00* (2019.01)
(Continued)

(52) U.S. Cl.
CPC .......... *H04L 67/1095* (2013.01); *G06N 5/04* (2013.01); *G06N 20/00* (2019.01); *H04L 51/36* (2013.01);
(Continued)

(58) Field of Classification Search
CPC . H04L 67/1095; H04L 51/36; H04L 67/1002; H04L 69/28; G06N 20/00; G06N 5/04
See application file for complete search history.

(56) References Cited

U.S. PATENT DOCUMENTS 6,279,029 B1 * 8/2001 Sampat ............... H04L 12/1859
709/203
8,443,379 B2 5/2013 Dar et al.
(Continued)

OTHER PUBLICATIONS

"Message ordering", Retrieved from: https://www.ibm.com/support/knowledgecenter/en/SSAW57_8.5.5/com.ibm.websphere.nd.multiplatform.doc/ae/cjj8000_.html, Retrieved Date: Oct. 14, 2019, 6 Pages.
(Continued)

*Primary Examiner* — Nasser M Goodarzi
*Assistant Examiner* — Adil Ocak

(57) ABSTRACT

The disclosure herein describes a message ordering system for processing and synchronizing chat messages in partitions to maintain messaging order and load balancing in a distributed system at scale. Messages are placed in partitions based on session identifiers (IDs). Messaging order is secured by a session receiver holding a lock over particular partitions. Receivers having subscription to messages in service bus are enabled to terminate on occurrence of a predetermined event, such as threshold wait time without receiving additional messages with a selected session ID from their partitions, activity level on a node, number of receivers on a node or other metrics. Session ID locks are released after a session ends, a receiver terminates or a node crashes for failure handling. New receivers are created to handle new incoming messages for additional load balancing and/or failover.

20 Claims, 13 Drawing Sheets

(51) Int. Cl.
  *G06N 5/04* (2006.01)
  *H04L 29/06* (2006.01)
  *H04L 12/58* (2006.01)

(52) U.S. Cl.
  CPC .......... *H04L 67/1002* (2013.01); *H04L 69/28* (2013.01); *H04L 67/42* (2013.01)

(56) References Cited

U.S. PATENT DOCUMENTS

| | | | |
|---|---|---|---|
| 9,641,685 B2 | 5/2017 | Lintner | |
| 10,353,893 B2 | 7/2019 | Teodorescu et al. | |
| 2004/0198322 A1 | 10/2004 | Mercer | |
| 2007/0220302 A1* | 9/2007 | Cline | H04L 67/02 714/4.1 |
| 2017/0264565 A1* | 9/2017 | Gosselin-Harris | H04L 47/782 |
| 2018/0007204 A1 | 1/2018 | Klein et al. | |
| 2018/0198698 A1* | 7/2018 | Rife | H04L 12/2809 |
| 2020/0120541 A1* | 4/2020 | Wang | H04L 47/627 |

OTHER PUBLICATIONS

"Workload sharing with publish/subscribe messaging", Retrieved from: https://www.ibm.com/support/knowledgecenter/en/SSAW57_8.5.5/com.ibm.websphere.nd.multiplatform.doc/ae/cjt0015_.html, Retrieved Date: Oct. 14, 2019, 6 Pages.

Balasubramanian, et al., "Manage sessions in Omnichannel for Customer Service", Retrieved from: https://docs.microsoft.com/en-us/dynamics365/omnichannel/agent/agent-oc/oc-manage-sessions, Jul. 1, 2019, 9 Pages.

Bhatnagar, Anirudh, "Achieving Order Guametee in Kafka with Partitioning", Retrieved from: https://anirudhbhatnagar.com/2016/08/22/achieving-order-guarnetee-in-kafka-with-partitioning/, Aug. 22, 2016, 10 Pages.

* cited by examiner

PROCESSING AND ORDERING MESSAGES IN PARTITIONS

BACKGROUND

Asynchronous messaging permits one-way communication of messages, such as text messages and chat messages, between a client and a server. With asynchronous messages the client does not have to wait for a reply from the server after sending a first message prior to sending a second message. This enables completion of messaging even after the client fails for greater flexibility and availability. However, asynchronous messaging via multiple input channels between users and service support personnel in a distributed system can result in messages being delivered to the recipients out-of-order. This can result in confusion, inefficient utilization of resources and delayed response to user communications.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some examples provide a system for maintaining messaging order and load balancing asynchronous messages. A set of input channels receives a plurality of messages via a communications interface device. A service bus component places a first set of messages from the plurality of messages associated with a first session identifier (ID) into a first partition in a plurality of partitions. A second set of messages associated with a second session ID is placed into a second partition. The first partition is locked to a first receiver component. The second partition is locked to a second receiver component. A timer component calculates an elapsed time since a last message associated with a selected session ID is received. The receiver component associated with the selected session ID terminates if the elapsed time exceeds a threshold wait time.

Other examples provide a method of maintaining messaging order and load balancing asynchronous messages. A service bus component places a first message associated with a first session ID into a first partition in a plurality of partitions. A second message associated with a second session ID is placed into a second partition. The first partition is locked to a first receiver component. The first receiver component processes each message in the first set of messages in the first partition in a same order each message is received by the service bus component. The second partition is locked to a second receiver component. The second receiver component processes each message in the second set of messages in the second partition in the same order each message is received by the service bus component. The first receiver component is terminated if a predetermined event occurs. A third receiver component associated with the first session ID is created in response to receiving a third message associated with the first session ID. Following termination of the first receiver component, the third receiver component processes a set of messages associated with the first session ID, including the third message.

Still other examples provide a computer storage device having computer-executable instructions stored thereon for maintaining messaging order and load balancing asynchronous messages, which, on execution by a computer, cause the computer to perform operations including placing a first message associated with a first session identifier (ID) into a first partition and a second message associated with a second session ID into a second partition in a plurality of partitions, wherein asynchronous messages are placed into partitions based on a session ID associated with each message. A first session ID lock is applied to the first partition. The first receiver component processes each message in the first set of messages in the first partition in a same order each message is received by the service bus component. A second session ID lock is placed on the second partition, wherein the second receiver component processes each message in the second set of messages in the second partition in the same order each message is received by the service bus component. The first receiver component is terminated in response to occurrence of an elapsed time since a last message associated with the first session ID is received exceeding a threshold wait time.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
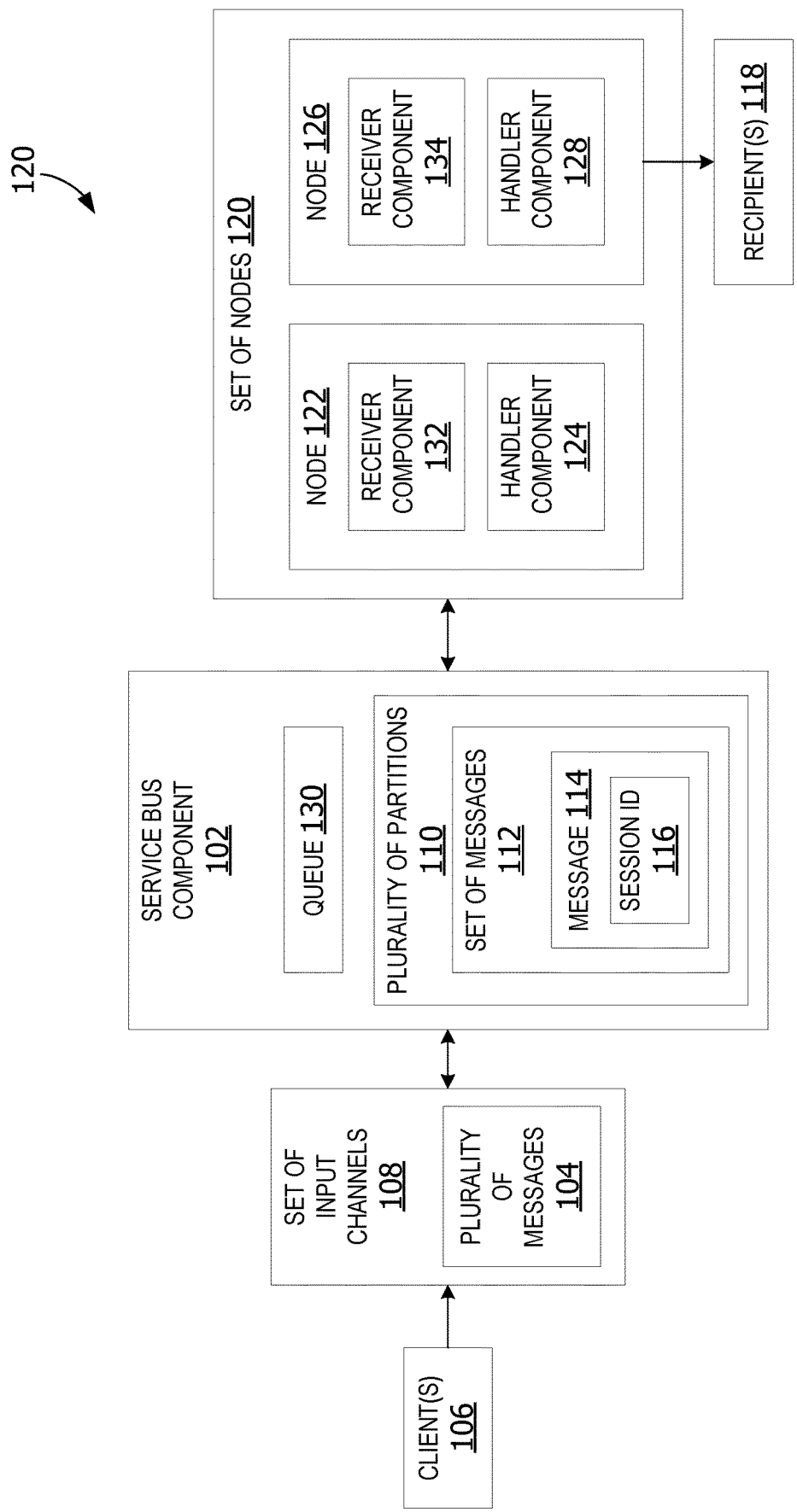
FIG. 1 is an exemplary block diagram illustrating a system for ordering asynchronous messages in a distributed system.

Multi-channel messaging provides chat communications between users (customers) and support agents through multiple communications channels. The communications channels can include asynchronous channels, such as short message service (SMS) and social media platforms. However, an issue occurring with these types of asynchronous communications includes the problem of maintaining the order of asynchronous messages in any conversation happening between a particular customer and an agent as the messages flow through the different microservices in an omni-channel cluster without putting a restriction on reliability and scale.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Aspects of the disclosure describe a system for processing and synchronizing chat messages in partitions to guarantee order and load balancing in a distributed system at scale. In some examples, a service bus is provided which stores incoming, unprocessed messages in separate partitions within a queue. All message having the same session ID indicating they are part of the same user session are placed into the same partition. Each partition only stores messages from the same session ID. A session receiver removes the messages one-at-a-time in the same order the messages were received by the service bus to preserve the ordering of the messages. This prevents messages from being sent to a recipient out-of-order and guarantees message order per-user for improved messaging accuracy and reduction of errors.

Furthermore, the service bus partitions enable placement of messages into dedicated partitions based on session ID. Only a session receiver component having a lock on a given partition is enabled to remove/receive messages for a given session from the service bus partition queue. This maintains high reliability for session receivers by having subscription to messages in service bus. The session receiver maintains order/sequencing of messages from multiple sources/multiple input channels by holding a lock over particular partitions. This prevents other receivers from removing messages/processing messages out-of-order in an asynchronous fashion for improved reliability and message flow between clients/senders and recipients.

Aspects of the disclosure provide a timeout component which automatically terminates a session receiver component if an elapsed time since the last new message was received meets or exceeds a maximum threshold wait time. Enabling receivers to time out after a few minutes or some other configurable "idle time" without receiving new messages and/or terminating the receiver on a node if the session ends improves load balancing and failure handling.

In other examples, messages are synchronized within partitions maintained by the service bus to guarantee order/sequence of messages from multiple applications and clients regardless of whether the current receiver terminates or is replaced by a new receiver on a different node. The improved sequencing minimizes confusion due to out-of-sequence messages and enables more accurate message processing while making message process more robust. This further reduces memory usage due to reduce or eliminated storage of state data associated with receivers and other messaging backup data.

FIG. 1 is an exemplary block diagram illustrating a system 100 for ordering asynchronous messages in a distributed system. In some examples, a service bus component 102 receives a plurality of messages 104 from one or more client(s) 106 via one or more channels in a set of input channels 108. The service bus component 102 is a component for implementing communications/messages between software components, such as, but not limited to, applications or microservices. The service bus component 102 can be implemented as an enterprise service bus in a service-oriented architecture for a distributed computing system in a client-server system.

A client in the set of client(s) 106 can include a human user sending messages via a user device (client). The client can also be implemented as a software component, such as, but not limited to, a microservice transmitting messages to another microservice, an application sending or receiving messages with another application, service, server, user or other entity.

The set of input channels 108 can include social media sources, short message service (SMS), instant messaging, chat messages or any other source of asynchronous messages. Social media sources can include any social media channel, such as, but not limited to, Facebook™ messaging. SMS is a text messaging service which uses standardized communication protocols for exchanging short text messages. SMS is frequently utilized, without limitation, by mobile devices, such as cellular telephones (smart phones), tablets, etc. In some non-limiting examples, the set of input channels 108 is implemented as an omni-channel cluster. An omni-channel cluster in one example is implemented as a Dynamics 365™ Omni-Channel for customer service.

The set of input channels 108 can receive messages from a server, a mobile computing device, a desktop computing device, a cloud server, a virtual machine or any other sender. A mobile computing device can include a cellular telephone, a tablet computer, a smart watch, a wearable computing device (smart glasses), or any other type of computing device. The system extends customer services to enable users to connect support agents and customers via SMS, social media and live chat across different channels.

A cloud server is a logical server providing services to a client. The cloud server can be hosted and/or delivered via a network. In some non-limiting examples, a cloud server is associated with one or more physical servers in one or more data centers. In other examples, the cloud server can be associated with a distributed network of servers.

The service bus component 102 places incoming messages into a plurality of partitions 110 which are managed by the service bus. The plurality of partitions 110 includes partitions for a set of one or more messages 112, such as, but not limited to, the message 114. Each message is placed into a partition based on a session ID 116 for each message. The session ID 116 is a unique identifier associated with a messaging session between a sender (client) and a recipient (receiver), such as, but not limited to, the one or more recipient(s) 118.

The service bus component 102 places all incoming messages having the same session ID 116 into the same partition in the plurality of partitions 110. All messages with the same session ID are placed into the same partition by the service bus component 102.

In some examples, each partition in the plurality of partitions 110 includes messages for one session ID assigned to that partition. For example, all messages for a first session between a first user and a first recipient are placed into a first partition and all messages associated with a second session between a second user and a second recipient are placed into a second partition.

Each node in a set of one or more nodes 120 includes a handler component. In this non-limiting example, the node 122 includes the handler component 124 and the node 126 includes the handler component 128. The handler component is instantiated/created at the node start-up time. In other words, every node includes a handler component which is always present from the time the node is created/setup.

A message which has not yet been processed can be placed into a queue 130 in some examples. When a handler component sees/identifies the message 114 in the queue, it determines/identifies the session ID for the message. The handler component determines whether a receiver component for the session ID 116 is currently executing on any node in the set of nodes 120. If not, the handler component creates a receiver component on the node to process incoming messages having the session ID 116. In some examples, the handler component creates a session receiver for a session ID for each message it receives from the service bus.

A message is processed by the receiver component by performing one or more actions associated with the message. In one example, processing the message includes delivering the message to an agent/microservice, parsing the message, analyzing the message, converting the message to a different format, altering the message to make it compatible with a different platform, etc. For example, a message can be processed to convert it from a format compatible with a client system to a format compatible with an agent or other recipient's system and then forwarded to the agent/recipient.

Each receiver component on each node is locked to a partition in the plurality of partitions 110 such that the receiver component only processes messages for a specific session ID. In this non-limiting example, the receiver component 132 on node 122 processes messages having a first session ID associated with a first messaging session and the receiver component 134 on the node 126 processes messages having a different, second session ID associated with a different, second messaging session. In other words, the receiver component 132 only pulls messages out of the partition which is locked to the receiver component 132 while the other receiver component 134 pulls messages out/off of a different partition which is locked to the receiver component 134. In this way, only one receiver component handles messages for a given messaging session (session ID). This ensures messaging order.

In some examples, when a session receiver component is created on a node for an incoming message session ID, the node is selected using a methodology such as, but not limited to a round robin methodology. In these examples, the system selects the next node from a list of nodes. The new receiver is instantiated on the selected node. In other words, when a node is needed for receiver creation, the next node in a predetermined order is chosen in a top to bottom fashion from a list.

In other examples, a next node to be used for creating a session receiver is selected based on a priority system in which a highest priority node is selected. Other methodologies for selecting a node to execute a new receiver can include selection of a node based on performance metrics or resource usage. For example, the system can select a node from a plurality of nodes that has the fewest number of session receiver components, the node that has the lowest resource usage, the node having the fastest message processing rates, etc.

Figure 2:
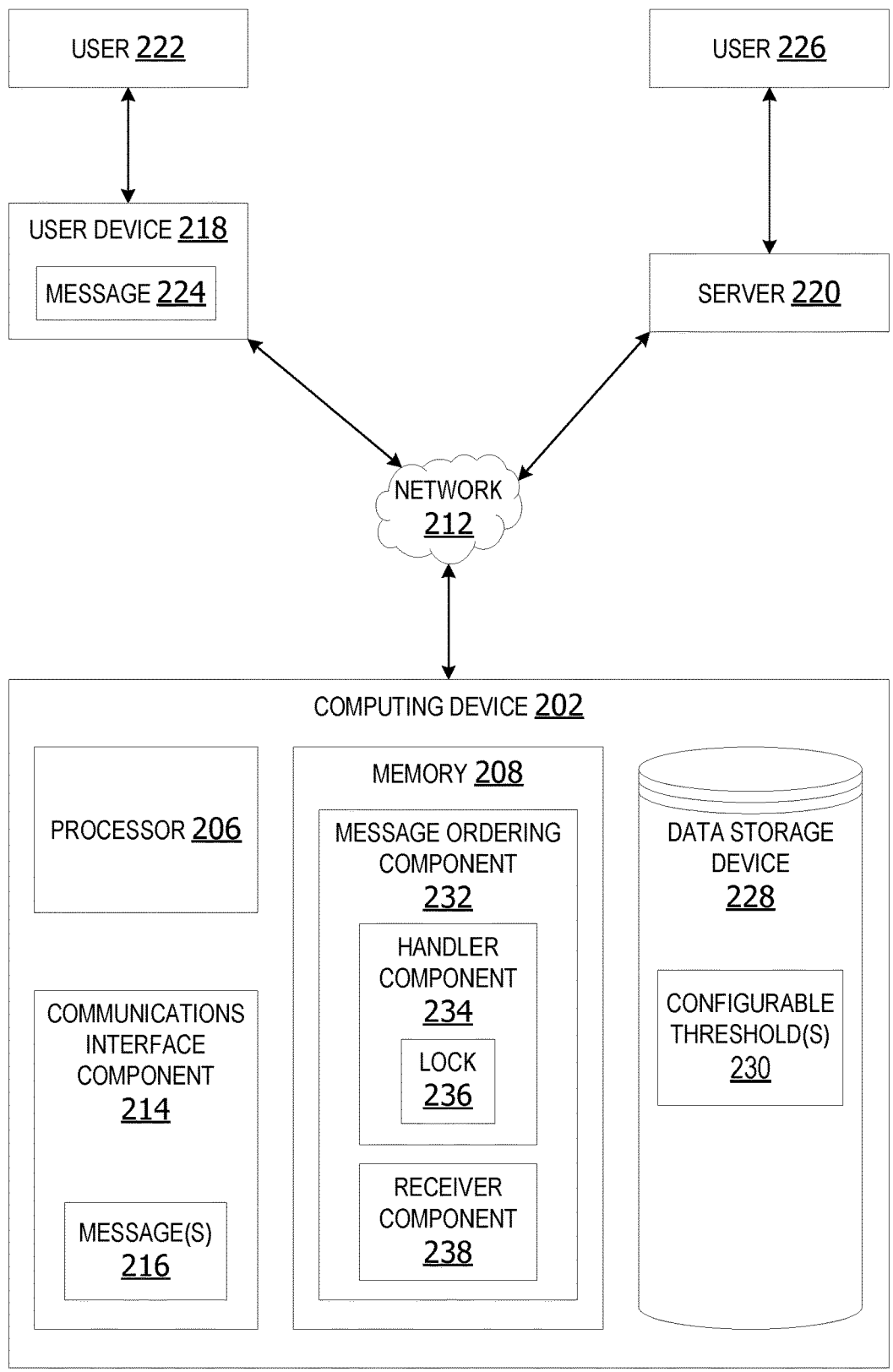
FIG. 2 is an exemplary block diagram illustrating a distributed system for ordering and load balancing messages.

FIG. 2 is an exemplary block diagram illustrating a distributed system 200 for ordering and load balancing messages. The computing device 202 represents any device executing computer-executable instructions (e.g., as application programs, operating system functionality, or both) to implement the operations and functionality associated with the computing device 202. The computing device 202 in some examples includes a mobile computing device or any other portable device. The computing device 202 can also include less-portable devices such as servers, desktop personal computers, kiosks, or tabletop devices. Additionally, the computing device 202 can represent a group of processing units or other computing devices. In some examples, the computing device 202 has at least one processor 206 and a memory 208.

The processor 206 includes any quantity of processing units and is programmed to execute the computer-executable instructions. The computer-executable instructions are performed by the processor 206, performed by multiple processors within the computing device 202 or performed by a processor external to the computing device 202. In some examples, the processor 206 is programmed to execute instructions such as those illustrated in the figures (e.g., FIG. 10, FIG. 11, FIG. 12 and FIG. 13).

The computing device 202 further has one or more computer-readable medium, such as the memory 208. The memory 208 includes any quantity of media associated with or accessible by the computing device 202. The memory 208 in these examples is internal to the computing device 202 (as shown in FIG. 2). In other examples, the memory 208 is external to the computing device (not shown) or both (not shown).

The memory 208 stores data, such as one or more applications. The applications, when executed by the processor 206, operate to perform functionality on the computing device 202. The applications can communicate with counterpart applications or services such as web services accessible via a network 212. In an example, the applications represent downloaded client-side applications that correspond to server-side services executing in a cloud.

The network 212 is implemented by one or more physical network components, such as, but without limitation, routers, switches, network interface cards (NICs), and other network devices. The network 212 is any type of network for enabling communications with remote computing devices, such as, but not limited to, a local area network (LAN), a subnet, a wide area network (WAN), a wireless (Wi-Fi) network, or any other type of network. In this example, the network 212 is a WAN, such as the Internet. However, in other examples, the network 212 is a local or private LAN.

In some examples, the system 200 optionally includes a communications interface component 214 for sending and receiving message(s) 216. The communications interface component 214 includes a network interface card and/or computer-executable instructions (e.g., a driver) for operating the network interface card. Communication between the computing device 202 and other devices, such as but not limited to a user device 218 and/or a server 220, can occur using any protocol or mechanism over any wired or wireless connection. In some examples, the communications interface component 214 is operable with short range communication technologies such as by using near-field communication (NFC) tags.

The user device 218 represents any device executing computer-executable instructions. The user device 218 can be implemented as a mobile computing device, such as, but not limited to, a wearable computing device, a mobile telephone, laptop, tablet, computing pad, netbook, gaming device, and/or any other portable device. The user device 218 includes at least one processor and a memory. The user device 218 can also include a user interface component.

The user interface component can include a graphics card for displaying data to the user and receiving data from the user 222, such as the message 224. The user interface component can also include computer-executable instructions (e.g., a driver) for operating the graphics card. Further, the user interface component can include a display (e.g., a touch screen display or natural user interface) and/or computer-executable instructions (e.g., a driver) for operating the display. The user interface component can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor.

The system 200 can optionally include a server 220. The server can include a web server, an application server, a cloud server or any other type of server. In some examples, the server is a device associated with a user 226 responding to user 222 messages for assistance and/or information. For example, the user 222 can include a customer contacting support personnel at a help desk or other system support, such as troubleshooting.

The system can optionally include a data storage device 228 for storing data, such as, but not limited to configurable threshold(s) 230. The configurable threshold(s) 230 include one or more configurable threshold values for determining when/if to terminate or timeout a receiver component. In some examples, the configurable threshold(s) 230 include a maximum threshold wait time without receiving a new message for a selected session ID, a maximum threshold number of receiver components on a node, a threshold activity level on a given node, a threshold processing time for processing a message by a receiver component, or any other metric-based threshold value.

The threshold wait time is an amount of time during which no new messages are received from the locked partition before the receiver is terminated on the node. The threshold wait time in one example is three minutes. In this example, if two minutes have passed without receiving a new message, the receiver will continue to execute/wait. However, when three minutes have passed since the last new message was received, the receiver automatically performs a time-out to terminate the receiver on the node.

In another example, the threshold wait time is ten minutes. In this example, if the time interval since the last new message was received from the partition associated with the receiver reaches ten minutes, a timeout occurs.

The timeout used to terminate session receivers prevents a receiver for a session ID from running on the same node for an extended period of time when no new messages are being received. The timeout also permits session receivers to be move from one node to another by terminating the receiver on one node and then recreating the receiver on another node if a new message is received for the same session ID.

The configurable threshold(s) 230 used to control the timeouts/terminations of receivers in this example are stored in the data storage device 228. In other examples, the configurable threshold(s) 230 can be stored in the memory 208 or downloaded from a cloud server.

The configurable threshold(s) 230 can be user-generated/user-configured threshold value(s). In other examples, the configurable threshold(s) 230 are generated by a machine learning component based on metric data collected during message processing.

The data storage device 228 can include one or more different types of data storage devices, such as, for example, one or more rotating disks drives, one or more solid state drives (SSDs), and/or any other type of data storage device. The data storage device 1xx in some non-limiting examples includes a redundant array of independent disks (RAID) array. In other examples, the data storage device 228 includes a database. In still other examples, the data storage device 228 includes a set of one or more partitions, such as, but not limited to, the plurality of partitions 110 in FIG. 1.

The data storage device 228 in this example is included within the computing device 202, attached to the computing device, plugged into the computing device or otherwise associated with the computing device 202. In other examples, the data storage device 228 includes a remote data storage accessed by the computing device via the network 212, such as a remote data storage device, a data storage in a remote data center, or a cloud storage.

The data storage device(s) may include rotational storage, such as a disk. The data storage device(s) may also include non-rotational storage media, such as a solid-state drive (SSD) or flash memory. In some non-limiting examples, the data storage device(s) provide a shared data store accessible by two or more hosts in a cluster. For example, the data storage device may include a hard disk, a redundant array of independent disks (RAID), a flash memory drive, a storage area network (SAN), or other data storage device.

The memory 208 in some examples stores one or more computer-executable components, such as, but not limited to, a message ordering component 232. The message ordering component 232, when executed by the processor 206 of the computing device 202 includes a handler component 234. In some examples, the handler component 234 places a lock 236 on a partition storing unprocessed/queued asynchronous messages associated with a selected session. The messages in the locked partition all include the same session ID. In other non-limiting examples, a receiver component 238 places the lock 236 on the partition associated with the selected session ID.

The handler component 234 in some examples checks to determine whether a receiver component created to process messages for the selected session ID is already executing on a node within a cluster of nodes on the system 200. If the receiver component does not exist (has not yet been created or has already terminated), the handler component 234 creates a new receiver component 238 on a node to process the messages in the locked partition.

The receiver components are created and terminated dynamically based on real-time data. Receivers are created when new messages for a new session are received. Likewise, receivers are timed-out when new messages for the session are no longer being received, the session has ended and/or the node executing the receiver fails/crashes. When a receiver is terminated due to a time-out, failed node, ended session or other metric data indicating termination is appropriate, the partition locked to the terminated receiver is released (unlocked). This enables a new receiver to be created which can be locked to the partition if another message with the same session ID is received. This load balances receivers across nodes in cluster(s). A session receiver that receives messages for a partition does not live/execute on the same node permanently. Instead it can be moved from one node to another node based on real-time metric data and rates of incoming messages. This improves flow of messages across microservices in the system.

Figure 3:
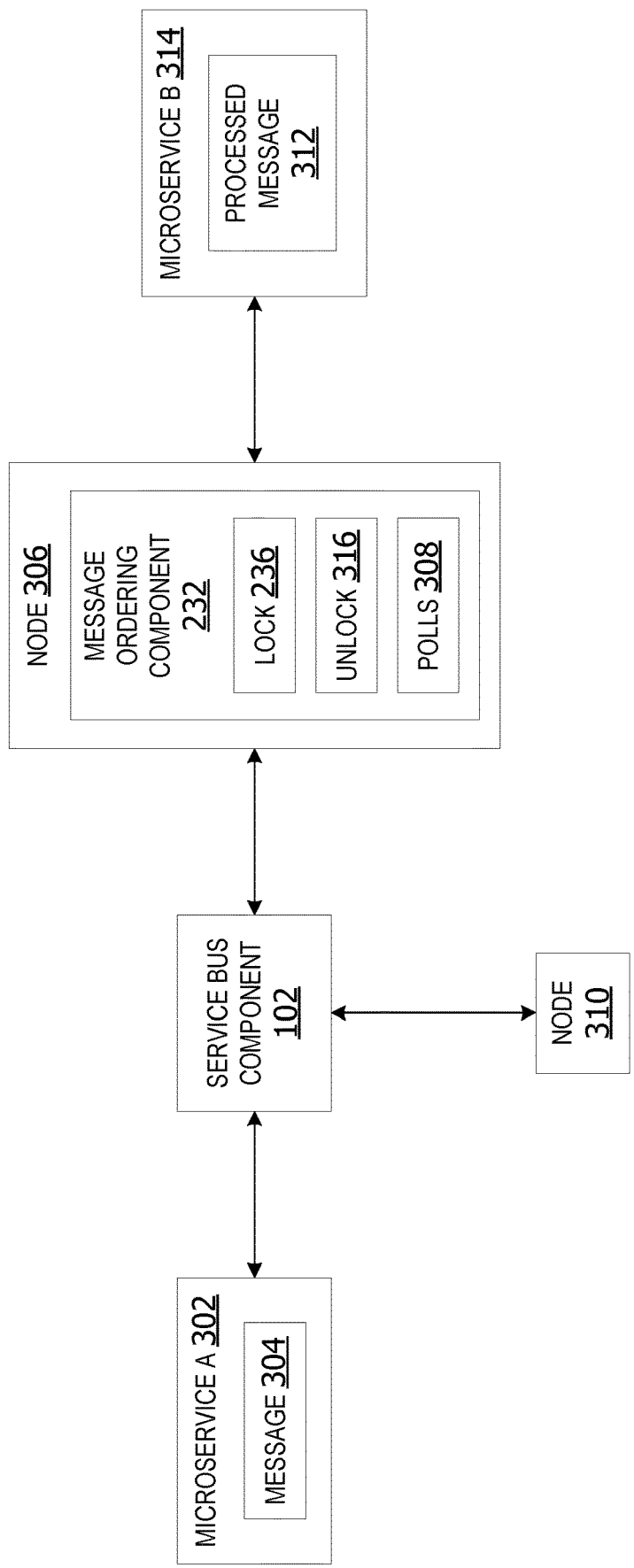
FIG. 3 is an exemplary block diagram illustrating a system for ordering asynchronous messages between microservices.

FIG. 3 is an exemplary block diagram illustrating a system 300 for ordering asynchronous messages between microservices. In this example, a first microservice 302 sends asynchronous messages to the service bus component 102, such as, but not limited to, the message 304. The system 300 in some examples is a distributed system. The system 300 can include a single cluster as well as multi-cluster environment.

The service bus component 102 places the message 304 in a partition assigned to the session ID of the message 304. A message ordering component 232 on a node 306 in a set of nodes polls 308 for messages from a selected partition in the order the messages were sent from the client. In some examples, the message ordering component polls the service bus for the next new (unprocessed) message within the partition waiting/queued for processing by the receiver component. The next message is determined based on the order in which the messages are received at the service bus component.

The set of nodes can include two or more nodes, such as, but not limited to, the set of nodes 120 in FIG. 1. In this example the set of nodes includes the node 306 and the node 310. However, the set of nodes is not limited to two nodes. In other examples, the set of nodes includes three or more nodes in one or more clusters within a distributed computing system.

The message ordering component 232 places a lock 236 on the given partition storing the message 304. In some examples, the handler component of the message ordering component 232 places the lock on the partition. In other examples, the receiver component places the lock 236 on the partition.

When the message ordering component 232 polls the service bus 102, the message ordering component 232 sees the message 304. The message ordering component 232 identifies the session ID for the message 304. The message ordering component 232 determines if there is already a currently executing receiver component for the session ID of the message 304. If there is already a receiver component, the message ordering component 232 permits that receiver component to handle processing of the message. If there is not a receiver component, the message ordering component 232 creates the new receiver component for the session ID of the message 304 on the node 306.

In this example, the lock 236 is placed prior to checking for a receiver component. In other examples, the message ordering component 232 checks for a receiver component and/or creates the receiver component prior to locking the partition or simultaneously with placing the lock on the partition storing the message 304 and other messages for the same session ID.

When the receiver component on the message ordering component 232 completes processing the message 304, the message ordering component 232 sends the processed message 312 to the recipient microservice B 314. The message ordering component 232 performs an unlock 316 on the partition to unlock the receiver component from the partition when the session ends or the receiver component terminates/times-out.

The service bus component permits a session receiver component to acquire a lock for a particular partition. No other receiver component created for the same session ID can receive messages from the partition until the lock is released. In other words, until the lock on the partition is released, only a single receiver can receive/obtain/process a message from the locked partition.

Figure 4:
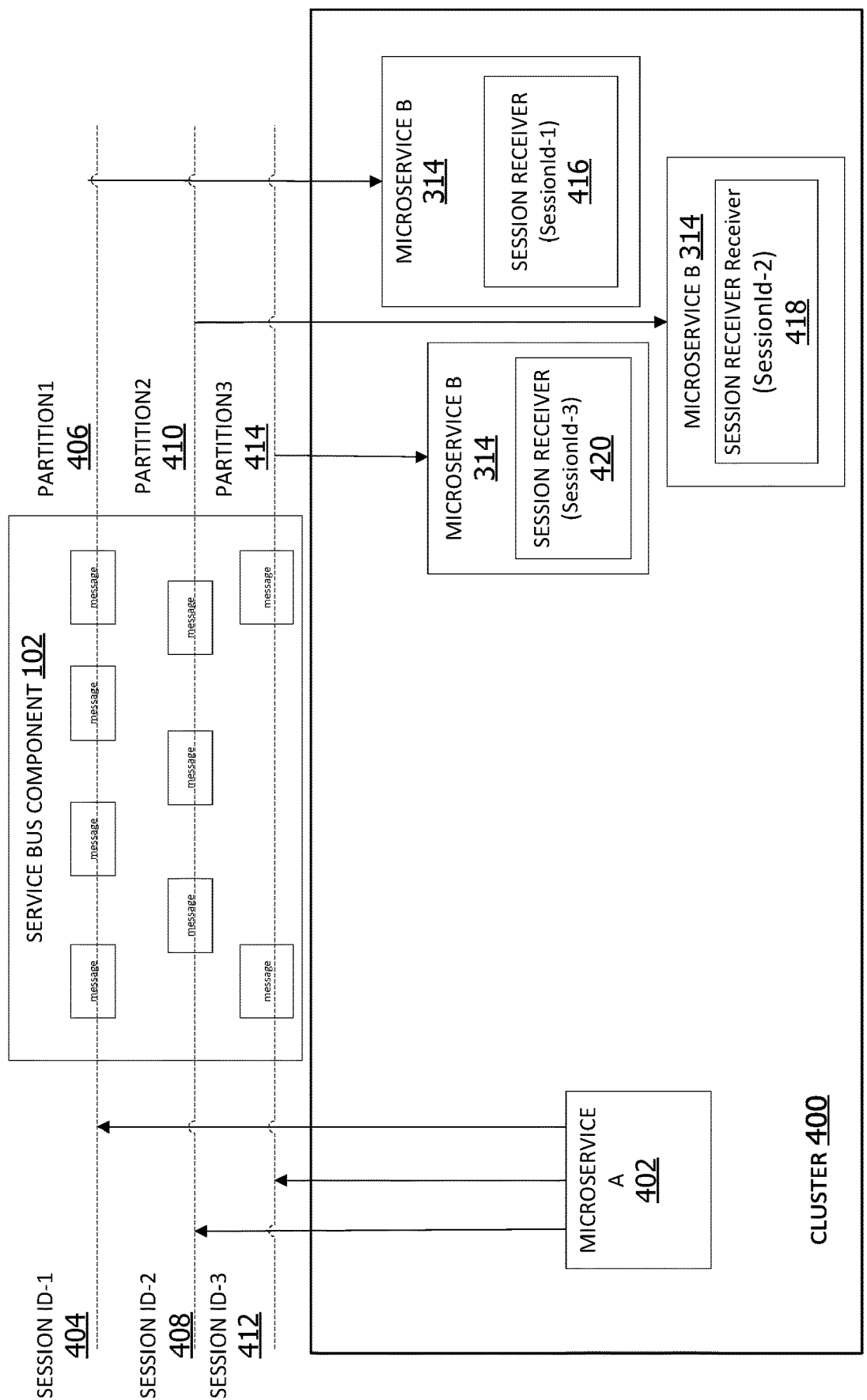
FIG. 4 is an exemplary block diagram illustrating placing messages in partitions based on session identifier (ID).

FIG. 4 is an exemplary block diagram illustrating placing messages in partitions based on session identifier (ID). In this example, the service bus 102 receives a set of messages from one or more clients, such as, but not limited to, a microservice 402. The set of messages includes four messages having a first session ID 404. The first session ID messages are placed into a first partition 406. A set of three messages having a second session ID 408 are placed into a second partition 410 by the service bus component 102. A set of two messages generated during a third session have a third session ID 412. The messages for the third session ID 412 are placed into the third partition 414.

The messages for each session are sent to a receiver component for each session associated with the cluster 400. In this example, the messages for the first session ID 404 are all processed by the first session receiver component 416. The messages in the second partition 410 are locked to the second session receiver component 418. The receiver component 418 is the only receiver that processes the messages in the second partition 410. The third receiver component 420 processes the messages in the third partition 414. The third receiver component 420 locks the third partition so that the other receivers 416 and 418 cannot access/process the messages in the third partition 414.

Figure 5:
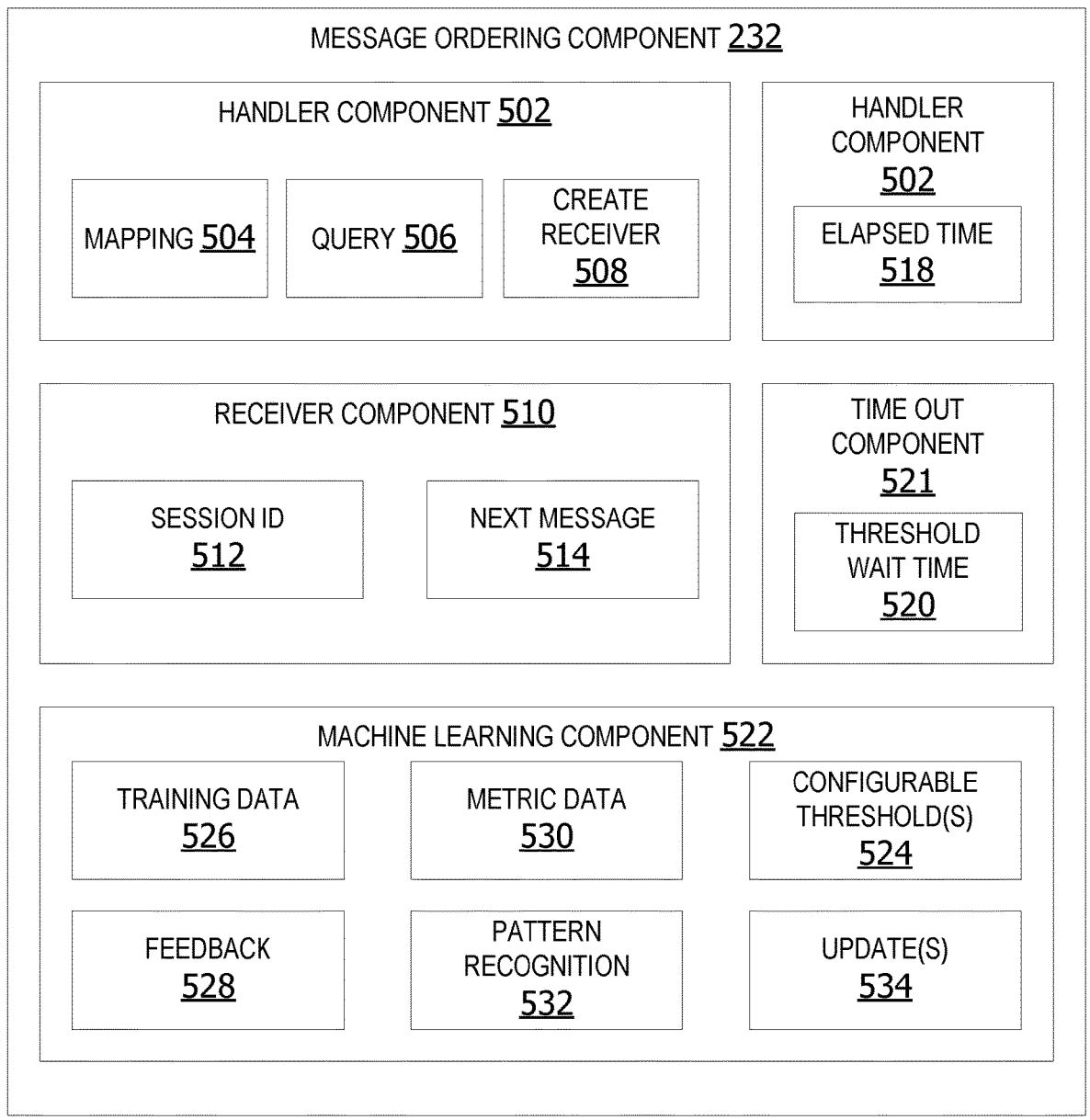
FIG. 5 is an exemplary block diagram illustrating a message ordering component.

FIG. 5 is an exemplary block diagram illustrating a message ordering component 232. The message ordering component 232 includes a handler component 502. The handler component 502 can include a mapping 504 or the ability to access a mapping 504 showing which receiver components are processing messages for each session ID.

The system in some examples maintains mapping between the receiver and session ID to allow receiver/session ID lookup using a tuple (task ID, cancellation token). Session receivers can be cached on memory in cluster node that created the receiver as a concurrent dictionary. The session ID is used as a key index and tuple contain session receiver as a dot net task (.NET task). The cancellation token can be used as a value set in a dictionary entry. In this manner, the handler component can query the mapping to determine if a session receiver component for a given session ID is already in existing executing on a node or if a new receiver should be created for messages having the session ID.

In some examples, the handler component 502 sends a query 506 to the service bus component to check for incoming messages/queued messages. If a message is in the queue, the handler component identifies the session ID for the message. The handler component 502 checks the mapping to see if there is a currently executing receiver component for the session ID. If not, the handler component 502 creates a receiver component on the node hosting the message ordering component 232 for the session ID (to process messages having the session ID), such as, but not limited to, the receiver component 510.

The receiver component 510 in some examples processes a next message 514 in the partition queue locked to the receiver component 510. In this example, the partition locked to the receiver component includes messages having the same session ID 512.

A timer component 516 in some examples measures/calculates an amount of time (time-interval) passing between receipt of messages with the session ID 512. If the amount of lapsed time 518 exceeds a threshold wait time 520, a timeout component 521 puts the receiver component into time-out. In some examples, placing the receiver component 510 into time-out terminates the receiver component 510. Once terminated, the receiver component 510 is no longer executing on the node (removed/deleted).

The threshold wait time 520 in this example is a user-selected/configurable threshold. In other examples, the threshold values for the configurable threshold(s) 524 are configured by a machine learning component 522. The configurable threshold(s) 524 can include, without limitation, a threshold wait time, a threshold processing time, a threshold number of receivers on a node, a threshold activity level, etc.

The machine learning component 522 may include pattern recognition 532, modeling, or other machine learning algorithms to analyze training data 526, feedback 528, metric data 530 and/or other available information to generate update(s) 534 to the configurable threshold(s) 524. The metric data 530 includes performance data such as, but not limited to, message processing time (duration of processing), etc. The feedback 528 optionally includes user feedback data associated with message processing performance creating a feedback loop to optimize load balancing on the system. In one example, the system learns average time each receiver runs and configures the threshold wait time to optimize load balancing (minimize idle time).

In some examples, the machine learning component 222 uses the data stored in one or more databases with real-time metric data to learn how to optimize termination of receiver components on nodes based on real-time performance data and the configurable threshold(s).

Figure 6:
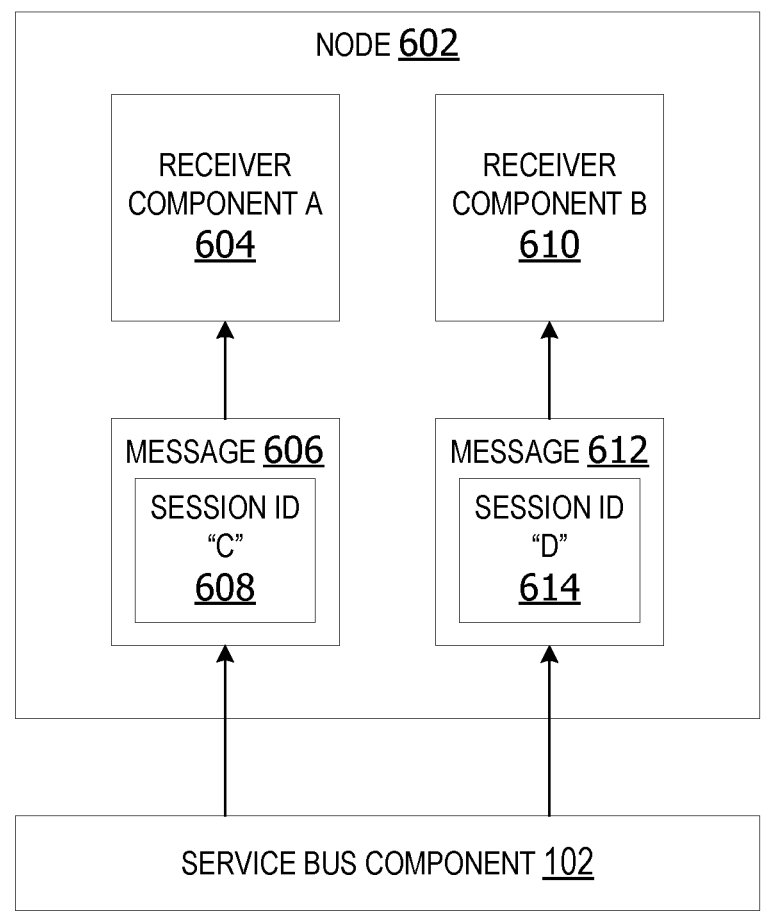
FIG. 6 is an exemplary block diagram illustrating a node hosting a set of receiver components.

FIG. 6 is an exemplary block diagram illustrating a node 602 hosting a set of receiver components. In this example, the set of receiver components includes two receivers. In other examples, the set of receiver components can include three or more receivers.

A receiver component receives all messages for a given session ID incoming on the service bus component 102. The receiver component 604 in this example receives messages for the session ID 608, such as, but not limited to, message 606. The receiver component 610 processes messages created during the session associated with the session ID 614, such as, but not limited to, the message 612.

Figure 7:
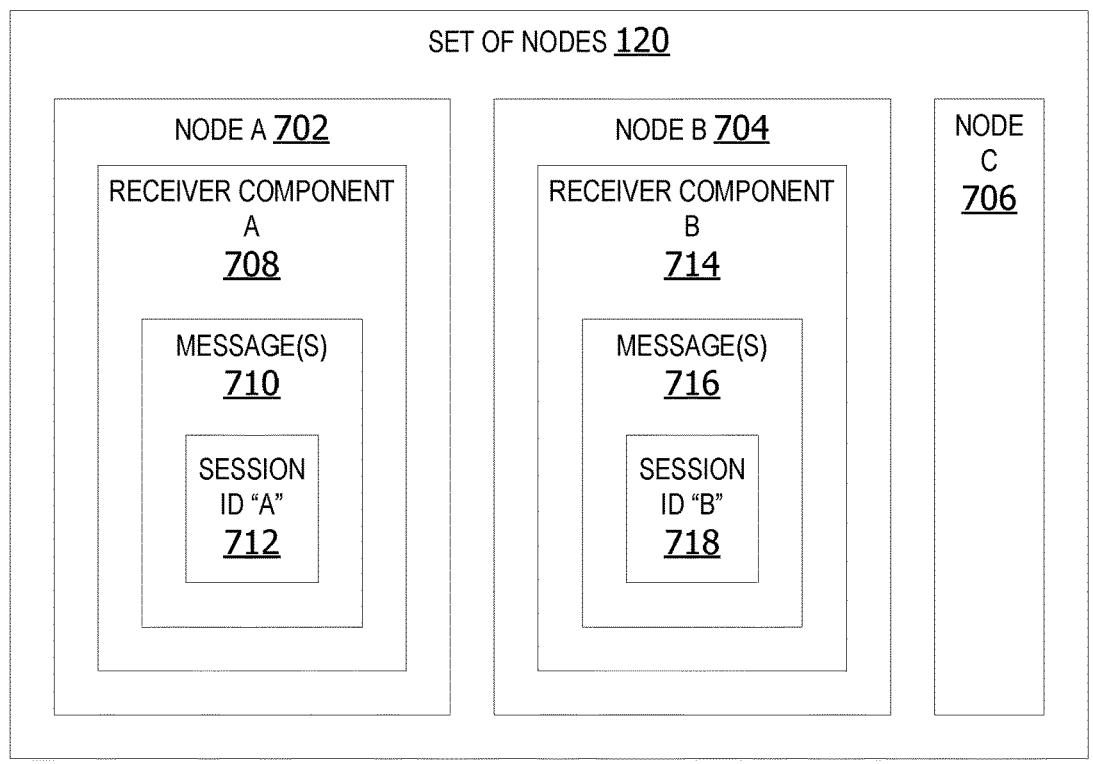
FIG. 7 is an exemplary block diagram illustrating a set of nodes hosting a set of receiver components for processing messages.

FIG. 7 is an exemplary block diagram illustrating a set of nodes 120 hosting a set of receiver components for processing messages. In this example, the set of nodes 120 includes three nodes, node 702, node 704 and node 706. The node 702 has a receiver component 708 executing on it. The receiver component 708 processes message(s) 710 having session ID 712. The node 704 includes a receiver component 714 locked to a partition storing message(s) 716 with session ID 718. The receiver component 708 processes each message with the session ID 718 one-at-a-time in the order in which the messages are received at the service bus component from the client (message sender). The node 706 in this example does not include a receiver component.

In this example, the node 702 and node 704 each have a single receiver component executing on the node. However, the examples are not limited to running one receiver component on each node. In other examples, a single node can execute two or more receiver components locked to two or more partitions.

If a predetermined event occurs, a receiver component running on a node can terminate (timeout). For example, if a predetermined time-period passes without the receiver component 708 receiving a next message having the session ID 712, the receiver component 708 times-out (terminates).

Figure 8:
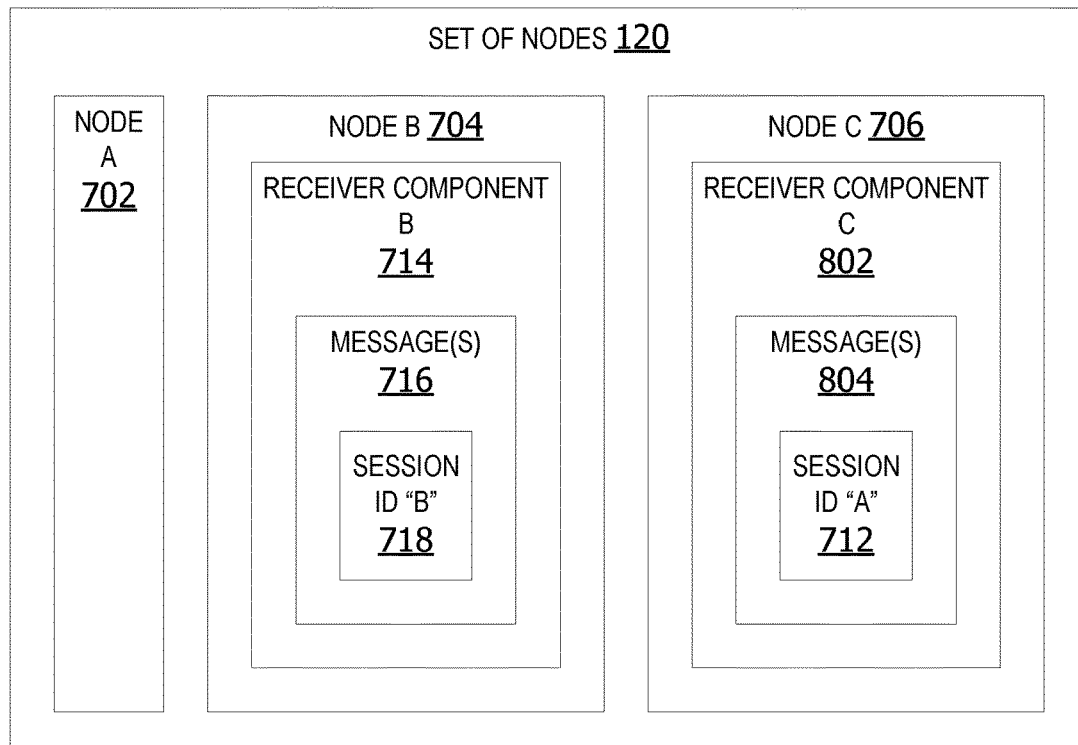
FIG. 8 is an exemplary block diagram illustrating creation of a new receiver component on a node in the set of nodes for processing messages associated with a selected session ID.

FIG. 8 is an exemplary block diagram illustrating creation of a new receiver component on a node 706 in the set of nodes for processing messages associated with a selected session ID. In this non-limiting example, the receiver component 708 executing on the node 702 terminated/timed-out after a threshold wait time passed without a new message having the session ID 712 received by the service bus component. After the receiver component 708 terminated, one or more new message(s) 804 having the session ID 712 is received. The handler component creates a new receiver component 802 on another node 706 to process the session ID 712 incoming message(s) 804.

Figure 9:
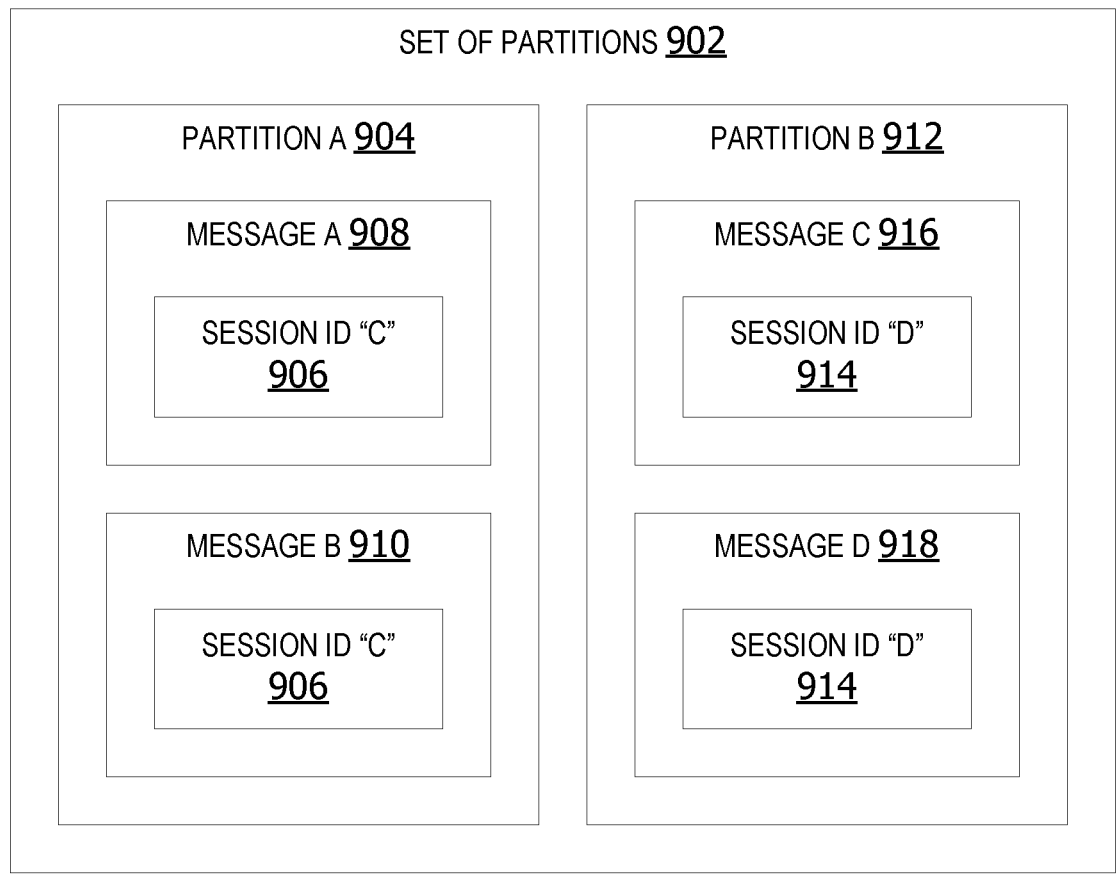
FIG. 9 is an exemplary block diagram illustrating a set of partitions for partitioning messages based on session ID.

FIG. 9 is an exemplary block diagram illustrating a set of partitions 902 for partitioning messages based on session ID. In this non-limiting example, the service bus component places messages having a first session ID 906 into a first partition 904. In this non-limiting example, the set of messages partitioned into partition 904 includes a first message 908 and a second message 910. In other examples, the partition 904 can include a null (empty) set of messages, a single message, as well as three or more messages having the session ID 906.

The second partition 912 in this example stores unprocessed messages having a second session ID 914. The set of messages in this example includes a first message 916 and a second message 918. However, in other examples, the set of messages can include a null set, a single message, as well as three or more messages including the session ID 914.

Figure 10:
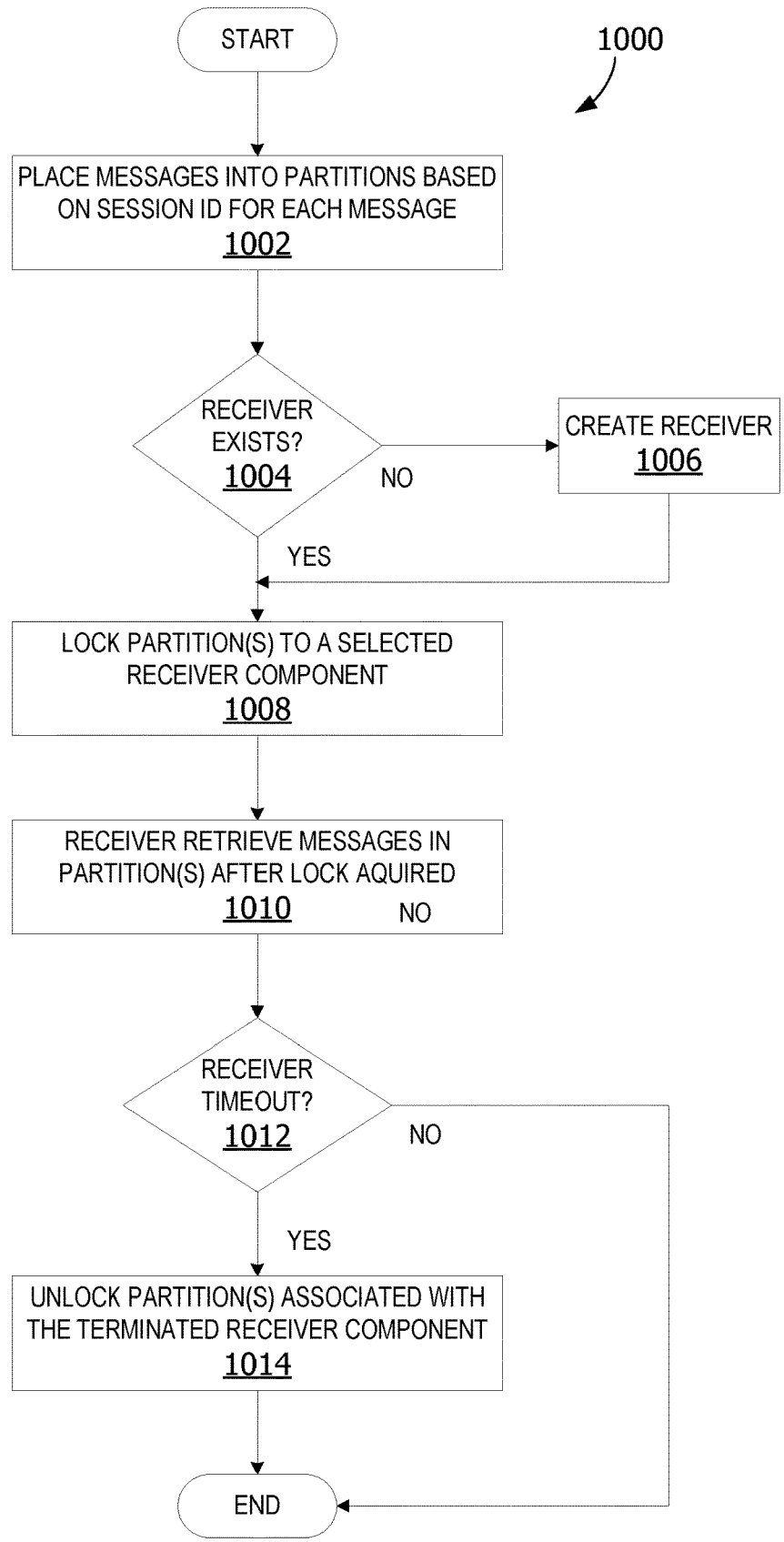
FIG. 10 is an exemplary flow chart illustrating operation of the computing device to place messages into partitions based on session ID.

FIG. 10 is an exemplary flow chart 1000 illustrating operation of the computing device to place messages into partitions based on session ID. The process shown in FIG. 10 is performed by a message ordering component, executing on a node (computing device), such as the set of nodes 120 in FIG. 1, computing device 202 and/or computing device 1400 of FIG. 14.

The process begins by placing incoming messages into one or more partitions based on a session ID for each message at 1002. The session ID is a sender/receiver session identifier included in each message at the service bus component 102, such as, but not limited to, the session ID 116 in FIG. 1. A determination is made as to whether a receiver exists for a given partition at 1004. If no, the receiver is created at 1006. The receiver is locked to one or more selected partitions at 1008. The receiver retrieves messages in the one or more partition(s) after the lock is acquired at 1010. The message ordering component determines if a receiver component timeout occurs at 1012. If yes, the message ordering component unlocks the partition(s) associated with the terminated receiver component at 1014. The process terminates thereafter.

While the operations illustrated in FIG. 10 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 10. Computer-readable storage media may also be referred to as computer-readable medium, computer-readable media and/or computer-readable storage medium.

Figure 11:
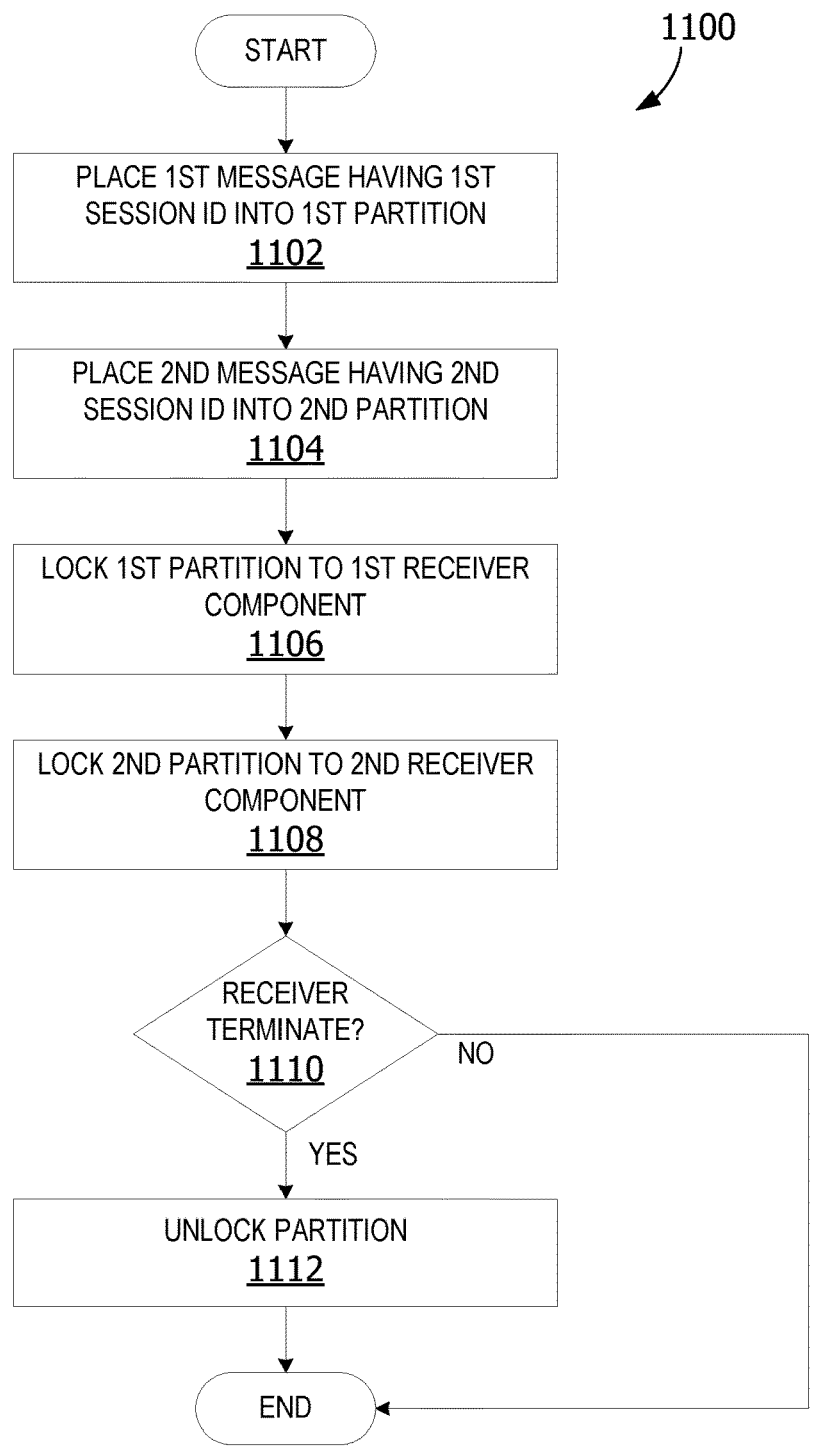
FIG. 11 is an exemplary flow chart illustrating operation of the computing device to lock a partition to receiver components based on session ID.

FIG. 11 is an exemplary flow chart 1100 illustrating operation of the computing device to lock a partition to receiver components based on session ID. The process shown in FIG. 11 is performed by a message ordering component, executing on a node (computing device), such as the set of nodes 120 in FIG. 1, computing device 202 and/or computing device 1400 of FIG. 14.

The process begins by placing a first message having a first session ID into a first partition at 1102. The partition is a message partition such as, but not limited to, the plurality of partitions 110 in FIG. 1. A service bus component places a second message having a second session ID into a second partition at 1104. A first message ordering component locks the first partition to the first receiver component at 1106. If the first receiver component does not already exist, the first receive component is created prior to locking the first receive to the first partition. If a second receiver component does not exist, the second receiver component is also created. A second message ordering component locks a second partition to the second receiver component at 1108. A determination is made whether a receiver terminates at 1110. If yes, the partition associated with the terminated receiver is unlocked at 1112. The terminated receiver may be the first receiver, the second receiver, or any other receiver associated with the system. The process terminates thereafter.

While the operations illustrated in FIG. 11 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 11.

Figure 12:
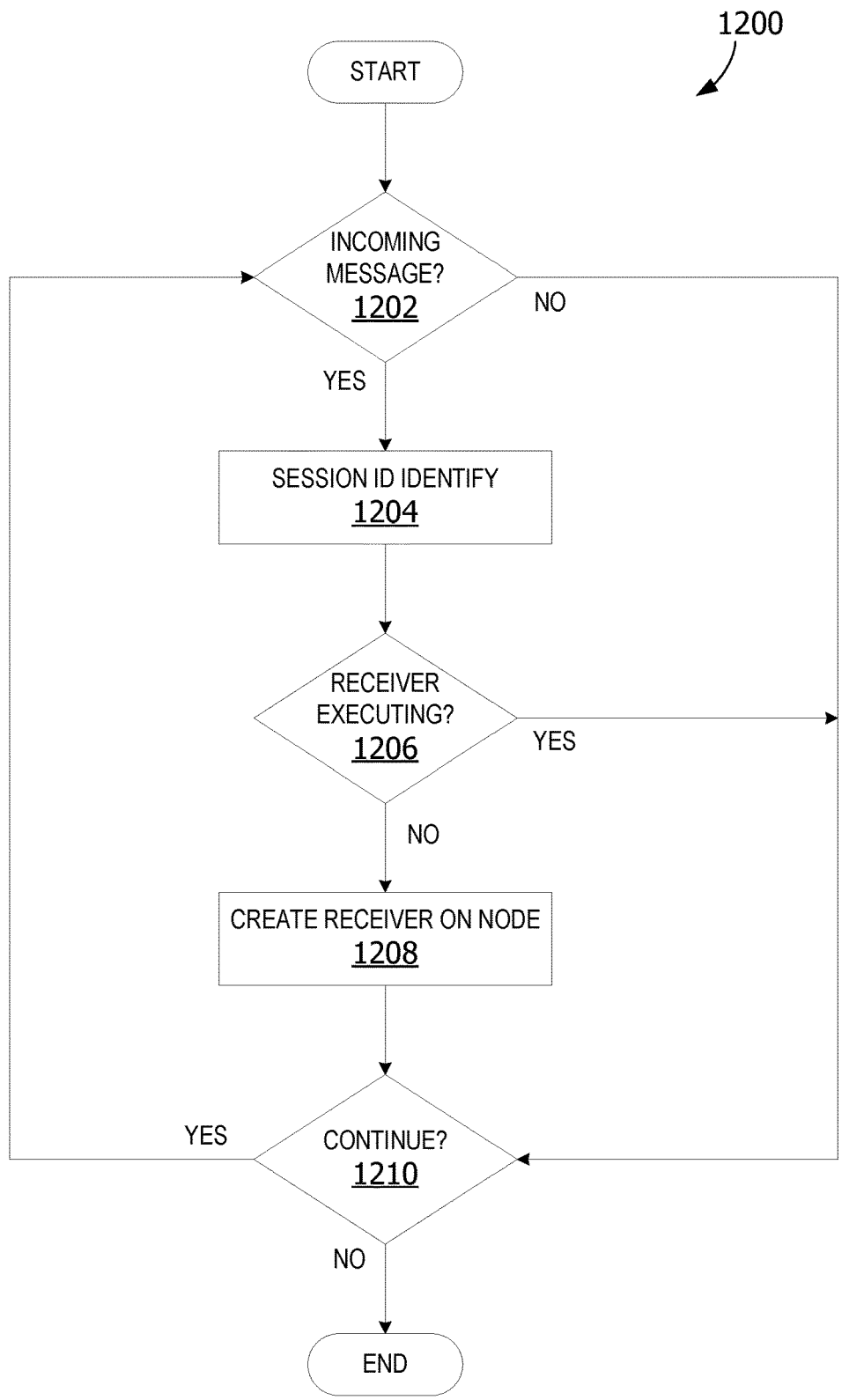
FIG. 12 is an exemplary flow chart illustrating operation of the computing device to create a receiver component on a node.

FIG. 12 is an exemplary flow chart 1200 illustrating operation of the computing device to create a receiver component on a node. The process shown in FIG. 12 is performed by a message ordering component, executing on a node (computing device), such as the set of nodes 120 in FIG. 1, computing device 202 and/or computing device 1400 of FIG. 14.

The process begins by determining if a message is incoming at 1202. If yes, the message ordering component identifies a session ID for the message at 1204. The message ordering component determines if a receiver component for the session ID is already executing on a node at 1206. If yes, the message ordering component creates a receiver for the session ID on a node at 1208. The message ordering component determines whether to continue at 1210. If yes, the message ordering component iteratively executes operations 1202 through 1210 until a determination is made to discontinue at 1210. The process terminates thereafter.

While the operations illustrated in FIG. 12 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 12.

Figure 13:
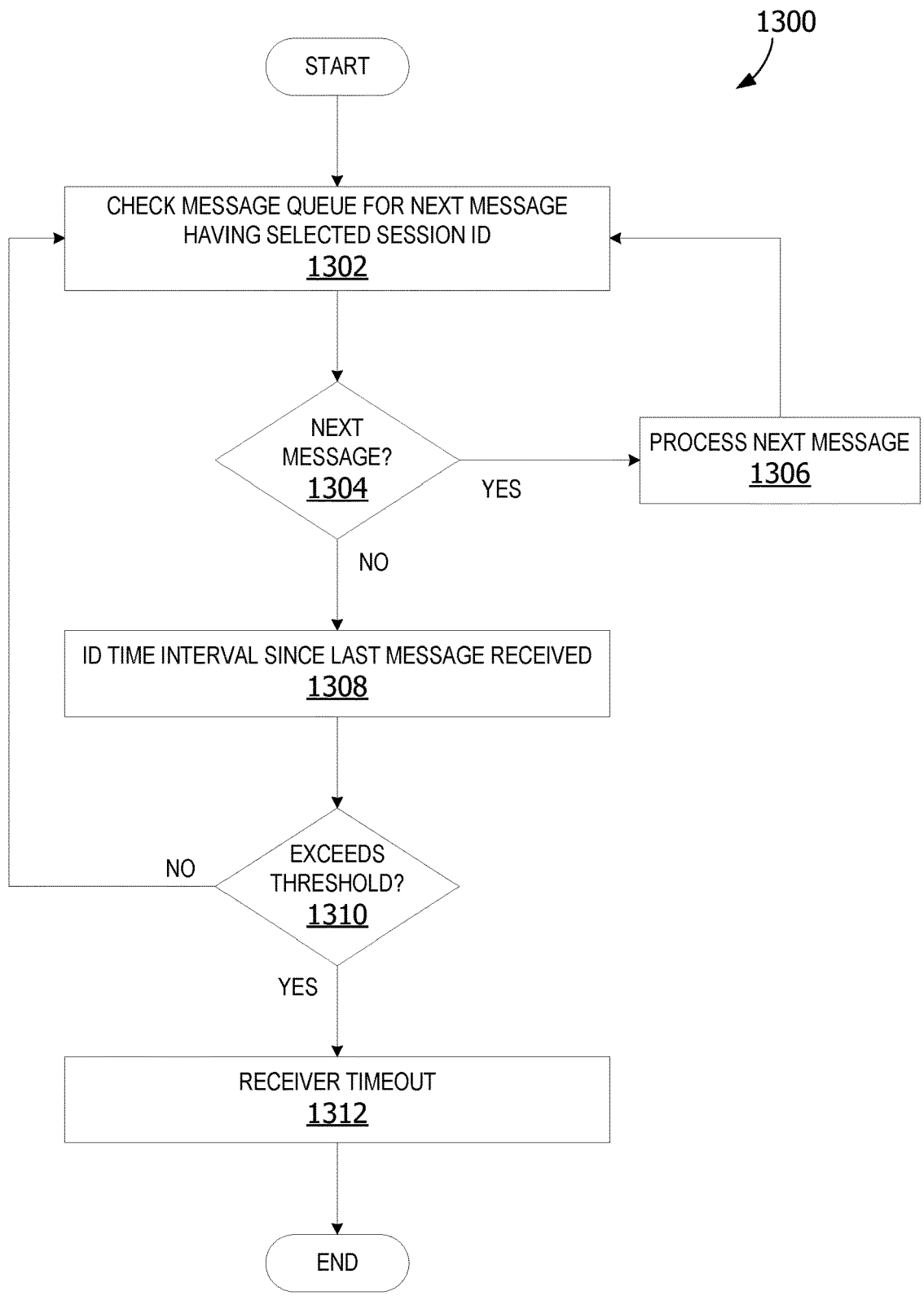
FIG. 13 is an exemplary flow chart illustrating operation of the computing device to terminate a receiver component based on a wait time threshold.

FIG. 13 is an exemplary flow chart 1300 illustrating operation of the computing device to terminate a receiver component based on a wait time threshold. The process shown in FIG. 13 is performed by a message ordering component, executing on a node (computing device), such as the set of nodes 120 in FIG. 1, computing device 202 and/or computing device 1400 of FIG. 14.

The process begins by checking a message queue associated with a service bus component for a next message having a selected session ID at 1302. The message ordering component determines if there is a next message at 1304. If yes, the receiver component associated with the session ID for the message processes the next message and the process returns to 1302. If a next message is not received at 1304, the message ordering component identifies a time interval (elapsed time) since the last message with the session ID was received at 1308. The message ordering component determines if the elapsed time interval exceeds a threshold wait time at 1310. If yes, the receiver component times-out (terminates) at 1312. The process terminates thereafter.

While the operations illustrated in FIG. 13 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 13.

Additional Examples

Some aspects and examples disclosed herein are directed to a system, method and/or computer executable instructions for maintaining messaging order and load balancing asynchronous message processing comprising: a processor; and a computer-readable medium storing instructions that are operative upon execution by the processor to: place, by a service bus component, a first set of messages from the plurality of messages associated with a first session identifier (ID) into a first partition in a plurality of partitions and a second set of messages associated with a second session ID into a second partition, wherein asynchronous messages are placed into partitions based on a session ID associated with each message; lock the first partition to a first receiver component on a first node in a set of nodes, wherein the first receiver component processes each message in the first set of messages in the first partition in a same order each message is received by the service bus component; and lock the second partition to a second receiver component on a second node in the set of nodes, wherein the second receiver component processes each message in the second set of messages in the second partition in the same order each message is received by the service bus component; and a timer component configured to calculate an elapsed time since a last message associated with the first session ID is received, wherein the first receiver component terminates responsive to the elapsed time exceeding a threshold wait time.

Additional aspects and examples disclosed herein are directed to a system, method or computer executable instruction for maintaining messaging order and load balancing asynchronous messages. A service bus component places a first message associated with a first session ID into a first partition in a plurality of partitions. A second message associated with a second session ID is placed into a second partition. The first partition is locked to a first receiver component. The first receiver component processes each message in the first set of messages in the first partition in a same order each message is received by the service bus component. The second partition is locked to a second receiver component. The second receiver component processes each message in the second set of messages in the second partition in the same order each message is received by the service bus component. The first receiver component is terminated responsive to occurrence of a predetermined event. A third receiver component associated with the first session ID is created responsive to receiving a third message associated with the first session ID. The third receiver component processes a set of messages associated with the first session ID, including the third message, following termination of the first receiver component.

Additional aspects and examples disclosed herein are directed to a system, method and/or one or more computer storage devices having computer-executable instructions stored thereon for maintaining messaging order and load balancing asynchronous messages, which, on execution by a computer, cause the computer to perform operations comprising: placing a first message associated with a first session identifier (ID) into a first partition and a second message associated with a second session ID into a second partition in a plurality of partitions, wherein asynchronous messages are placed into partitions based on a session ID associated with each message; applying a first session ID lock on the first partition, wherein the first receiver component processes each message in the first set of messages in the first partition in a same order each message is received by the service bus component; applying a second session ID lock on the second partition, wherein the second receiver component processes each message in the second set of messages in the second partition in the same order each message is received by the service bus component; and terminating the first receiver component responsive to an elapsed time since a last message associated with the first session ID is received exceeding a threshold wait time.

In an exemplary scenario, the service bus component receives a new message. A session receiver is created on a next node in a list using a round robin methodology. The new receiver starts processing the new message as well as other incoming messages having the same session ID. The messages are processed one-at-a-time in the same order in which the messages were received by the service bus. The first received message is processed first and the second message received by the service bus is removed from the dedicated same-session-identifier messages partition for processing by the receiver only after processing of the first message is complete. When the elapsed time between messages is equal to or exceeds a wait time threshold, the receiver performs a time out which kills the receiver.

In another example, a "Create Receiver" handler component is created at node startup time on each node in a cluster. When a message comes in at the service bus having a unique session ID, the "Create Receiver" handler component creates a "Message Process" receiver component. The receiver component processes each message in a partition for the unique session ID in the order in which the messages were received. If the receiver component fails, times-out or otherwise terminates, the service bus component preserves the incoming and queued messages until a new replacement receiver component is created by the handler component. The new replacement component can be created on a different node to improve load balancing. The service bus funnels the queued messages to the new replacement component one-at-a-time from the given partition for the session ID.

In another example, when a new message is received, the handler component retrieves the session ID from the message. The handler component queries a mapping to determine if a session receiver component for the session ID already exists. If so, the preexisting session receiver component processes the new message in the correct sequence corresponding to the sequence in which the message was received from the sender/client generating the message(s) during the given session represented by the session ID.

In another non-limiting scenario, a message comes into a service bus. A first handler acquires a lock on the session ID. The handler either identifies the existing receiver for the session ID or creates a new receiver (second handler) for the session ID. The handler tells the receiver to process the message. The receiver processes the message and forwards it on to the recipient. On occurrence of a timeout event, the receiver terminates. A second message comes in. The handler creates a second receiver (third handler) to process the new message. The second receiver processes the new message and pumps/tunnels the message on to the agent/recipient.

In other examples, the session receiver in some examples is a .NET task that polls service bus continuously in a loop to get messages from a particular partition in service bus. It passes messages off to an event handler associated with the receiver to execute. The session receiver can be consumed by an microservice that needs to receive messages from a partition in service bus. To maintain order, only one session receiver of messages for a particular session ID can receive messages from its corresponding partition at one time. The system caches session receivers in memory on the cluster node that created it as a concurrent dictionary that has the session ID as the key index to the dictionary and a tuple contains the session receiver .NET task and a cancellation taken as the value set in a dictionary entry.

To maintain high reliability for the session receivers, the system can include having a subscription to the messages in service bus on the receiving microservice side. The handler to this subscription is used to create the session receiver for the corresponding session ID for each message it receives from service bus if an executing receiver does exist in the cache on the node and a lock can be acquired for that session ID from service bus. The system does not have to keep state in a reliable store of all the session IDs that currently have receivers running in memory in case the node or cluster goes down because the system simply crates a new receiver component on a new node when a new message comes in. This reduces memory usage and improve failover.

Alternatively, or in addition to the other examples described herein, examples include any combination of the following:
  release the lock on the first partition responsive to termination of a session associated with the first session ID or termination of the first receiver component;
  create a third receiver on a next selected node in the set of nodes locked to the first partition responsive to receiving a next message associated with the first session ID after termination of the first receiver;
  wherein the next message is processed by the third receiver;
  terminate the second receiver component on occurrence of a predetermined event, wherein the predetermined event comprises a presence of a threshold number of receivers on the second node;
  terminate the second receiver component on occurrence of a predetermined event, wherein the predetermined event comprises a message processing time exceeding a maximum threshold message processing time;
  map the first receiver component to the first session ID;
  create, by a machine learning component, an updated threshold wait time based on metric data associated with processing of messages by a plurality of receivers;
  calculating an elapsed time since a last message associated with a selected session ID is received;
  terminating a receiver component associated with the selected session ID responsive to the calculated elapsed time exceeding a threshold wait time;
  creating the first receiver component on a first node in a set of nodes;
  creating the second receiver component on a second node in the set of nodes;
  releasing the lock on the first partition responsive to termination of a session associated with the first session ID;

releasing the lock between the first receiver component and the first partition responsive to termination of the first receiver component;
identifying a session ID associated with an incoming message;
responsive to a determination a receiver component associated with the identified session ID is absent, creating a receiver component for the identified session ID;
locking the created receiver component to a selected partition associated with the incoming message;
wherein the predetermined event comprises a presence of a threshold number of receivers on a selected node;
terminating at least one receiver component on the selected node responsive to a number of receivers on the selected node exceeding a maximum threshold number of receivers;
the predetermined event comprises a message processing time associated with a receiver component on a selected node exceeding a maximum threshold message processing time;
terminating the receiver component on the selected node responsive to the message processing time exceeding the maximum threshold message processing time;
releasing the lock between the third receiver component and the first partition responsive to termination of a session associated with the first session ID or termination of the third receiver component;
creating the first receiver component on a first node in a set of nodes;
creating the second receiver component on a second node in the set of nodes;
creating a third receiver on a next selected node in the set of nodes locked to the first partition responsive to receiving a next message associated with the first session ID after termination of the first receiver, wherein the next message is processed by the third receiver;
identifying a session ID associated with an incoming message;
responsive to a determination a receiver component associated with the identified session ID is absent, creating a receiver component for the identified session ID; and
locking the created receiver component to a selected partition associated with the incoming message.

While the aspects of the disclosure have been described in terms of various examples with their associated operations, a person skilled in the art would appreciate that a combination of operations from any number of different examples is also within scope of the aspects of the disclosure.

Example Operating Environment

Figure 14:
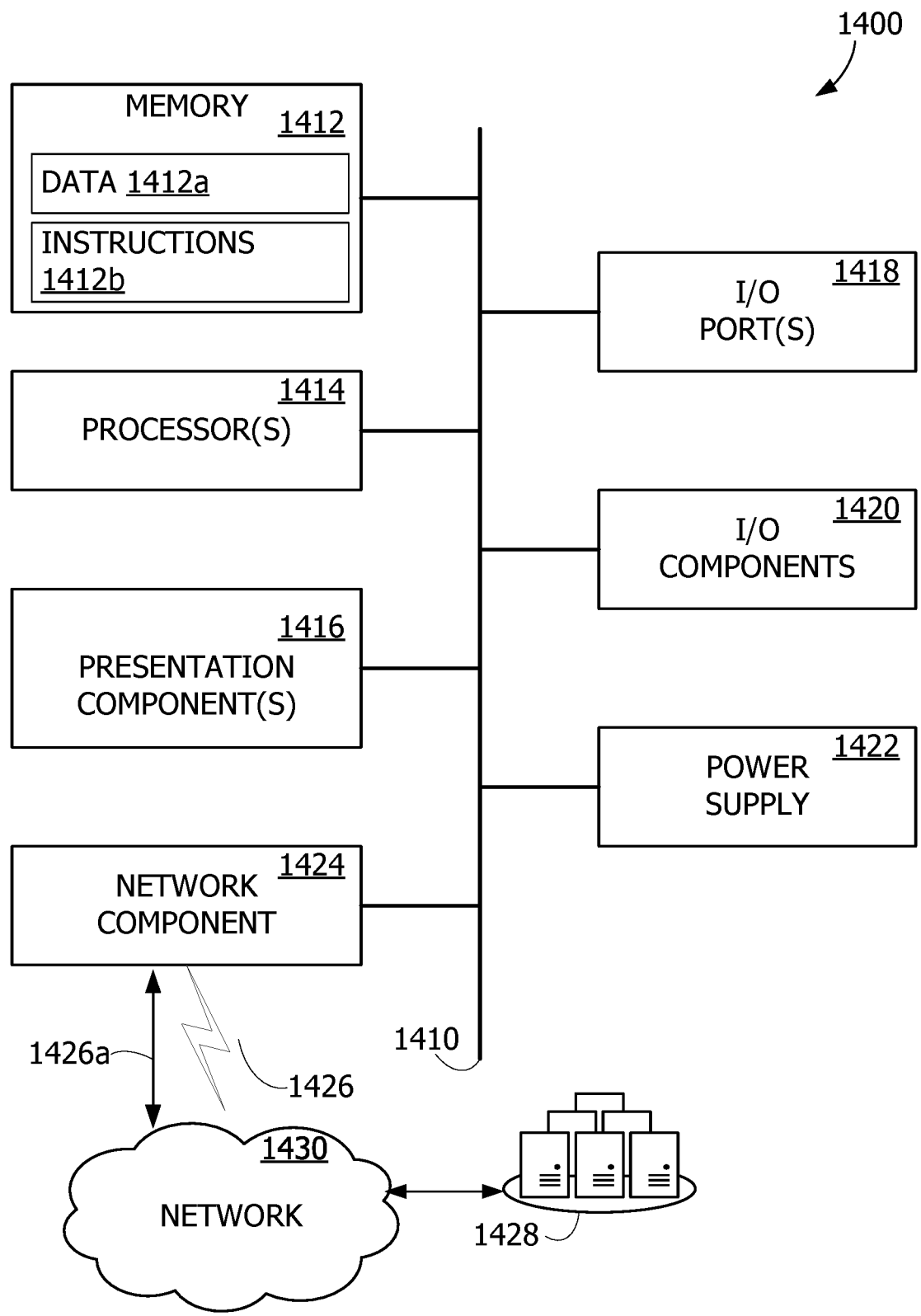
FIG. 14 is exemplary block diagram illustrating an example computing environment suitable for implementing some of the various examples disclosed herein.

FIG. 14 is a block diagram of an example computing device 1400 for implementing aspects disclosed herein and is designated generally as computing device 1400. Computing device 1400 is an example of a suitable computing environment and is not intended to suggest any limitation as to the scope of use or functionality of the examples disclosed herein. Neither should computing device 1400 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1400 includes a bus 1410 that directly or indirectly couples the following devices: computer-storage memory 1412, one or more processors 1414, one or more presentation components 1416, I/O ports 1418, I/O components 1420, a power supply 1422, and a network component 1424. While computing device 1400 is depicted as a seemingly single device, multiple computing devices 1400 may work together and share the depicted device resources. For example, memory 1412 may be distributed across multiple devices, and processor(s) 1414 may be housed with different devices.

Bus 1410 represents what may be one or more busses (such as an address bus, data bus, or a combination thereof). Although the various blocks of FIG. 14 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 14 and the references herein to a "computing device." Memory 1412 may take the form of the computer-storage media references below and operatively provide storage of computer-readable instructions, data structures, program modules and other data for computing device 1400. In some examples, memory 1412 stores one or more of an operating system, a universal application platform, or other program modules and program data. Memory 1412 is thus able to store and access data 1412*a* and instructions 1412*b* that are executable by processor 1414 and configured to carry out the various operations disclosed herein.

In some examples, memory 1412 includes computer-storage media in the form of volatile and/or nonvolatile memory, removable or non-removable memory, data disks in virtual environments, or a combination thereof. Memory 1412 may include any quantity of memory associated with or accessible by computing device 1400. Memory 1412 may be internal to computing device 1400 (as shown in FIG. 14), external to computing device 1400 (not shown), or both (not shown). Examples of memory 1412 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1400. Additionally, or alternatively, memory 1412 may be distributed across multiple computing devices 1400, for example, in a virtualized environment in which instruction processing is carried out on multiple computing devices 1400. For the purposes of this disclosure, "computer storage media," "computer-storage memory," "memory," and "memory devices" are synonymous terms for computer-storage memory 1412, and none of these terms include carrier waves or propagating signaling.

Processor(s) 1414 may include any quantity of processing units that read data from various entities, such as memory 1412 or I/O components 1420 and may include CPUs and/or GPUs. Specifically, processor(s) 1414 are programmed to execute computer-executable instructions for implementing aspects of the disclosure. The instructions may be performed by the processor, by multiple processors within computing device 1400, or by a processor external to client computing device 1400. In some examples, processor(s) 1414 are programmed to execute instructions such as those illustrated in the in the accompanying drawings. Moreover, in some examples, processor(s) 1414 represent an implementation of analog techniques to perform the operations described herein. For example, the operations may be performed by an analog client computing device 1400 and/or a digital client computing device 1400. Presentation component(s) 1416 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1400, across a wired connection, or in other ways. I/O ports 1418 allow computing device 1400 to be logically coupled to other devices including I/O components 1420, some of which may be built in. Example I/O components 1420 include, for example but without limitation, a microphone, joystick, game pad, satellite dish, scanner, printer, wireless device, etc.

Computing device 1400 may operate in a networked environment via network component 1424 using logical connections to one or more remote computers. In some examples, network component 1424 includes a network interface card and/or computer-executable instructions (e.g., a driver) for operating the network interface card. Communication between computing device 1400 and other devices may occur using any protocol or mechanism over any wired or wireless connection. In some examples, network component 1424 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1424 communicates over wireless communication link 1426a and/or a wired communication link 1426a to a cloud resource 1428 across network 1430. Various different examples of communication links 1426 and 1426a include a wireless connection, a wired connection, and/or a dedicated link, and in some examples, at least a portion is routed through the internet.

Although described in connection with an example computing device 1400, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for maintaining messaging order and load balancing asynchronous messages, the system comprising:
   a set of input channels receiving a plurality of messages via a communications interface device; and
   a computer-readable medium storing instructions that are operative upon execution by a processor to:
      place, by a service bus component, a first set of messages from the plurality of messages associated with a first session identifier (ID) into a first partition in a plurality of partitions and a second set of messages associated with a second session ID into a second partition, wherein asynchronous messages are placed into partitions based on a session ID associated with each message;
      determine that the first session ID is not associated with a previously created receiver component;
      create a first receiver component on a first node in a set of nodes, wherein the first receiver component is a task, which processes each message in the first set of messages in the first partition in a same order each message is received by the service bus component;
      lock the first partition to the first receiver component;
      cache the first receiver component and the first session ID on memory of the first node;
      determine that the second session ID is not associated with the previously created receiver component and the first receiver component;
      create a second receiver component on a second node in the set of nodes, wherein the second receiver component is a task, which processes each message in the second set of messages in the second partition in the same order each message is received by the service bus component;
      lock the second partition to the second receiver component;
      cache the second receiver component and the second session ID on memory in the second node; and
   a timer component configured to calculate an elapsed time since a last message associated with the first session ID is received, wherein the first receiver component terminates responsive to the elapsed time exceeding a threshold wait time.

2. The system of claim 1, wherein the instructions are further operative to:
   release the lock on the first partition responsive to termination of a session associated with the first session ID or termination of the first receiver component.

3. The system of claim 1, wherein the instructions are further operative to:
   create a third receiver component on a next selected node in the set of nodes locked to the first partition responsive to receiving a next message associated with the first session ID after termination of the first receiver component, wherein the next message is processed by the third receiver component.

4. The system of claim 1, wherein the instructions are further operative to:
   terminate the second receiver component on occurrence of a predetermined event, wherein the predetermined event comprises a presence of a threshold number of receivers on the second node.

5. The system of claim 1, wherein the instructions are further operative to:
   terminate the second receiver component on occurrence of a predetermined event, wherein the predetermined event comprises a message processing time exceeding a maximum threshold message processing time.

6. The system of claim 1, wherein the instructions are further operative to:
   map the first receiver component to the first session ID.

7. The system of claim 1, wherein the instructions are further operative to:
   create, by a machine learning component, an updated threshold wait time based on metric data associated with processing of messages by a plurality of receivers.

8. A method of maintaining messaging order and load balancing asynchronous messages, the method comprising:
   placing, by a service bus component, a first message associated with a first session identifier (ID) into a first partition in a plurality of partitions;
   placing a second message associated with a second session ID into a second partition;
   determining that the first session ID is not associated with a previously created receiver component;
   creating a first receiver component, wherein the first receiver component is a task, which processes each message in a first set of messages in the first partition in a same order each message is received by the service bus component;
   locking the first partition to the first receiver component;
   caching the first receiver component and the first session ID on memory of the first node;
   determining that the second session ID is not associated with the previously created receiver component and the first receiver component;
   creating to a second receiver component, wherein the second receiver component is a task, which processes each message in a second set of messages in the second partition in the same order each message is received by the service bus component;
   locking the second partition to the second receiver component;
   caching the second receiver component and the second session ID on memory in the second node;
   terminating the first receiver component responsive to occurrence of a predetermined event; and
   creating a third receiver component associated with the first session ID responsive to receiving a third message associated with the first session ID, wherein the third receiver component is a task, which processes a set of messages associated with the first session ID, including the third message, following termination of the first receiver component.

9. The method of claim 8, further comprising:
calculating an elapsed time since a last message associated with a selected session ID is received; and
terminating a receiver component associated with the selected session ID responsive to the calculated elapsed time exceeding a threshold wait time.

10. The method of claim 8, further comprising:
creating the first receiver component on a first node in a set of nodes; and
creating the second receiver component on a second node in the set of nodes, wherein the second node is selected from the set of nodes based on a performance metric, a resource usage rate, a number of session receiver components, or a processing rate.

11. The method of claim 8, further comprising:
releasing the lock on the first partition responsive to termination of a session associated with the first session ID.

12. The method of claim 8, further comprising:
releasing the lock between the first receiver component and the first partition responsive to termination of the first receiver component.

13. The method of claim 8, wherein the predetermined event comprises an activity level on a selected node exceeding a maximum threshold activity level, and further comprising:
terminating at least one receiver component on the selected node responsive to the activity level exceeding the maximum threshold activity level.

14. The method of claim 8, wherein the predetermined event comprises a presence of a threshold number of receivers on a selected node, and further comprising:
terminating at least one receiver component on the selected node responsive to a number of receivers on the selected node exceeding a maximum threshold number of receivers.

15. The method of claim 8, wherein the predetermined event comprises a message processing time associated with a receiver component on a selected node exceeding a maximum threshold message processing time, and further comprising:
terminating the receiver component on the selected node responsive to the message processing time exceeding the maximum threshold message processing time.

16. One or more computer storage devices having computer-executable instructions stored thereon for maintaining messaging order and load balancing asynchronous messages, which, on execution by a computer, cause the computer to perform operations comprising:
placing a first message associated with a first session identifier (ID) into a first partition and a second message associated with a second session ID into a second partition in a plurality of partitions, wherein asynchronous messages are placed into partitions based on a session ID associated with each message;
creating a first receiver component, which is a task that processes each message in a first set of messages in the first partition in a same order each message is received by a service bus component;
applying a first session ID lock on the first partition;
caching the first receiver component and the first session ID on memory of the first node;
creating a second receiver component which is a task that processes each message in a second set of messages in the second partition in the same order each message is received by the service bus component;
applying a second session ID lock on the second partition;
caching the second receiver component and the second session ID on memory of the second node;
terminating the first receiver component responsive to an elapsed time since a last message associated with the first session ID is received exceeding a threshold wait time.

17. The one or more computer storage devices of claim 16, wherein the operations further comprise:
releasing the lock between a third receiver component and the first partition responsive to termination of a session associated with the first session ID or termination of the third receiver component.

18. The one or more computer storage devices of claim 16, wherein the operations further comprise:
creating the first receiver component on a first node in a set of nodes; and
creating the second receiver component on a second node in the set of nodes, wherein the second node is selected from the set of nodes based on a performance metric, a resource usage rate, a number of session receiver components, or a processing rate.

19. The one or more computer storage devices of claim 16, wherein the operations further comprise:
creating a third receiver component on a next selected node in a set of nodes locked to the first partition responsive to receiving a next message associated with the first session ID after termination of the first receiver component, wherein the next message is processed by the third receiver component.

20. The one or more computer storage devices of claim 16, wherein the operations further comprise:
identifying a session ID associated with an incoming message;
responsive to a determination a previously created receiver component associated with the identified session ID is absent, creating a new receiver component for the identified session ID; and
locking the new receiver component to a selected partition associated with the incoming message.

* * * * *